A. KEITH.

Machines for Cutting Leather into Counters.

No. 5,733. Reissued Jan. 20, 1874.

WITNESSES.

N. Campbell.
John Baron

INVENTOR.

Aberdeen Keith
per
Brown Brothers
Attorneys.

AM. PHOTO-LITHOGRAPHIC Co. N.Y. (OSBORNE'S PROCESS)

UNITED STATES PATENT OFFICE.

ABERDEEN KEITH, OF NORTH BRIDGEWATER, MASSACHUSETTS.

IMPROVEMENT IN MACHINES FOR CUTTING LEATHER INTO COUNTERS.

Specification forming part of Letters Patent No. 44,318, dated September 20, 1864; reissue No. 5,733, dated January 20, 1874; application filed May 2, 1873.

*To all whom it may concern:*

Be it known that I, ABERDEEN KEITH, of North Bridgewater, Plymouth county, Massachusetts, have invented a Machine for Cutting Leather into Counters for Boots and Shoes, of which the following is a specification:

This invention relates to machines for cutting counters from a strip of leather, in which two feed-rollers are employed to feed the leather, and a splitting-knife to cut the leather as fed through, and at an acute angle to its thickness, thus giving to the line of cut a bevel or inclination from one surface of the leather to the other. The lower feed-roller is arranged as ordinarily for automatic adjustment to the varying thickness of the leather passing between the rollers, but in this invention the splitting-knife is connected to said lower and self-adjusting feed-roller in such manner as to move therewith, and thus be automatically adjusted as to its position for cutting the leather strip on a bevel for insuring substantially an even width of bevel surface along the line of cut, whatever may be the varying thickness of the leather.

In addition to the above in this invention, the feed-rollers are tapered from end to end, whereby the leather is split, as aforesaid, along a curve from end to end of its line of split in lieu of a straight line, as would be the case were the rollers of even diameter from end to end. This curvature in the line of split is important in boot and shoe counters, as is well known.

Figure 1:
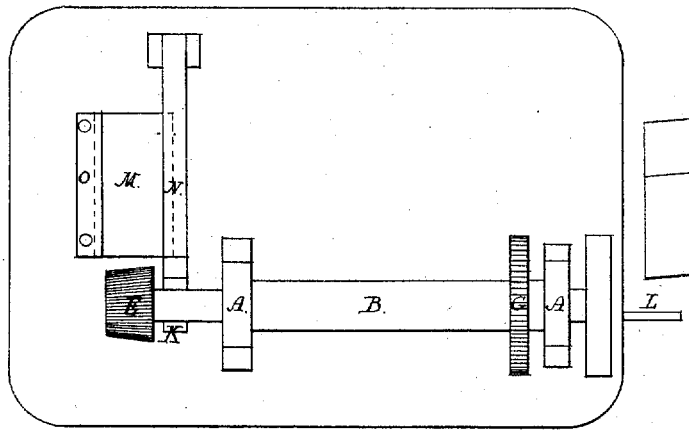
Figure 2:
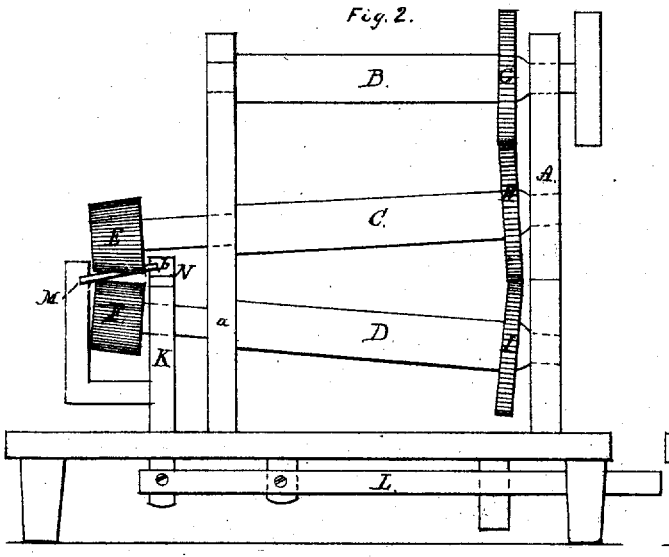
Figure 3:
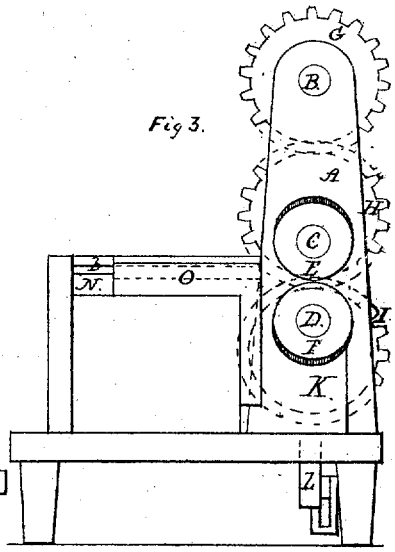

In the accompanying plate of drawings the present invention is illustrated, Figure 1 being a top view, Fig. 2 a front elevation, and Fig. 3 an end elevation.

In the drawings, A denotes the frame for supporting the main operative parts. Within the said frame are three shafts, B C D, which are disposed with respect to each other as seen in Fig. 2. Two of the said shafts, viz., C and D, are out of parallelism with one another and with the third shaft B, and carry or have fixed on their adjacent ends two tapering feed-rollers, E F, there being one of such rollers to each of the said shafts C D. The three shafts are connected by a train of gears, G H I, there being one of such gears to each of the shafts, the same being in order that rotary motion may be transmitted from the driving-shaft B to each of the other shafts whenever the shaft B may be put in revolution.

The lower shaft not only has one of its journals supported in a bearing made in the part *a* of the frame, but has the other journal supported in a bearing or post or standard, K, which is separated from the frame A, and at its lower end is sustained on and jointed to the inferior arm of a lever, L, which is arranged underneath the frame, and when the machine is in operation, is to have a weight suspended from its superior arm, the object of such weight, lever, and standard being to force the lower feed-roller toward the upper feed-roller, and allow the former to move or be moved away from the latter, in order to accommodate the rollers to the leather to be reduced to counters, as such leather may vary in thickness.

Figure 5:
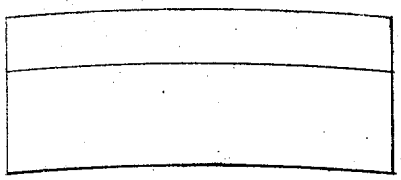
Figure 4:
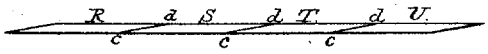

In advance of the bite of the two feed-rollers, there is a splitting-knife, M, one edge of which is supported within a groove, *b*, made in the stationary bracket or rail N. The opposite edge of the knife is similarly sustained in a bracket, O, projecting from the movable standard K, the whole being in such manner that any vertical movement of such standard and the lower feed-roller, whether such movement be upward or downward, shall cause the knife to be moved with the bracket O, and so as to vary the declination of the cutting-edge of the knife. The said cutting-edge of the knife is arranged diagonally with respect to the bite of the rollers, in order that while cutting the strip of leather to separate a counter therefrom, it may make such cut at an inclination with the opposite flat surface of the leather, in manner as shown at *c d c d*, in Fig. 4, which represent an edge view of a strip of leather, and the lines of cuts for the counter R S T U. In consequence of the rollers being tapering, they will cause each cut through the leather to be made on a curve, which will impart to each counter the form represented in Fig. 5, the transverse section of such counter being a parallelogram, as shown in Fig. 4.

In order to guide the leather properly between the rollers, there may be a table or platform arranged aside of them, and having a feed-board capable of being turned on a center, the radius of the circle of motion of such board corresponding with that of the curve of the knife-cut which will be caused by the action of the feed-rollers. Such feed-board may be provided with a ledge for the edge of the piece of leather to rest against. And, furthermore, there may be a stationary ledge or gage for the end of the strip to abut against, the said ledge being fixed on the top of the standard K. I mention the said table, feed-board ledge, and gage, simply as auxiliary to my invention.

In operating with this machine, the strip of leather to be reduced to counters is to be presented between and to the feed-rollers at such part of the strip as it may be desirable to cut through it, such feed-rollers being supposed to be in revolution in directions which will cause them to seize on the leather, and force it against the cutting-edge of the knife. As the thickness of the leather may increase more or less, so will the lower feed-roller be pressed away from the upper one, and at the same time will move downward one edge of the knife so as to impart a greater declination to the cutting-edge of such knife. As the thickness of the leather may decrease the lower feed-roller will rise, the knife also being raised at one and the same edge. Thus it will be seen that the cutting-edge of the knife will always be in the diagonal of the bite of the rollers, however that bite may increase or diminish in width.

What I claim, is—

1. In a machine for cutting leather into counters in combination with the feed-rollers E F, a splitting-knife arranged in advance of the same, and adapted to vary the declination of its cutting-edge in accordance with the variation of the distance between the rollers due to the varying thickness of leather, substantially as described.

2. In a machine for cutting leather into counters, the combination of the tapering feed-rollers with a cutting-knife arranged with them, as specified, the said rollers causing the knife to cut in a curved path, substantially as described, for the purpose specified.

3. In combination with feed-rollers and the knife, a mechanism for adjusting, in manner substantially as and for the purpose described, the declination of the knife in accordance with the variations of the distance between the feed-rollers, such mechanism, as explained, being the movable standard, its weighted lever, and knife-supporting brackets, the whole being connected with the lower feed-roller shaft, substantially as set forth.

The above specification of my improved machine for cutting leather into counters, signed by me this 7th day of February, 1872.

ABERDEEN KEITH.

Witnesses:
J. P. McElroy,
Albert W. Brown.